United States Patent
Shen et al.

(10) Patent No.: US 9,451,511 B2
(45) Date of Patent: Sep. 20, 2016

(54) METHOD AND APPARATUS FOR PROVIDING WIRELESS CONNECTION QUALITY GUIDANCE

(71) Applicant: QUALCOMM Incorporated, San Diego, CA (US)

(72) Inventors: Jian Shen, San Diego, CA (US); Jack Shyh-Hurng Shauh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/273,450

(22) Filed: May 8, 2014

(65) Prior Publication Data

US 2015/0327132 A1 Nov. 12, 2015

(51) Int. Cl.

| | |
|---|---|
| *H04J 1/16* | (2006.01) |
| *H04W 36/00* | (2009.01) |
| *H04W 4/04* | (2009.01) |
| *H04W 48/18* | (2009.01) |
| *H04W 36/14* | (2009.01) |
| *H04W 36/30* | (2009.01) |
| *H04W 36/36* | (2009.01) |
| *H04W 88/06* | (2009.01) |

(52) U.S. Cl.
CPC ........... *H04W 36/0083* (2013.01); *H04W 4/04* (2013.01); *H04W 48/18* (2013.01); *H04W 36/14* (2013.01); *H04W 36/30* (2013.01); *H04W 36/36* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,764,975 | B2 | 7/2010 | Hosono et al. |
| 8,494,558 | B2 | 7/2013 | Joensson et al. |
| 8,548,502 | B2 | 10/2013 | Karaoguz et al. |
| 8,595,365 | B2 | 11/2013 | Scott et al. |
| 2002/0059453 | A1 | 5/2002 | Eriksson et al. |
| 2007/0010259 | A1 | 1/2007 | Hoffmann |

(Continued)

FOREIGN PATENT DOCUMENTS

| | | | | |
|---|---|---|---|---|
| EP | 1830596 A1 | 9/2007 | | |
| WO | WO 2013104445 A1 | * | 7/2013 | .......... H04W 52/367 |
| WO | 2014163836 A1 | 10/2014 | | |

OTHER PUBLICATIONS

International Search Report and Written Opinion—PCT/US2015/028554—ISA/EPO—Sep. 7, 2015.

*Primary Examiner* — Kibrom T Hailu
(74) *Attorney, Agent, or Firm* — Arent Fox LLP (57) ABSTRACT

A user device determines a set of connection information at a current location of the device. The current connection information set includes one or more of current location information, current wireless channel information, current radio access technology information, and a current wireless channel quality metric. The device adds the current connection information set to a database of connection information that stores a plurality of sets of alternate connection information. Each alternate connection information set includes one or more of alternate location information, alternate wireless channel information, alternate radio access technology information, and an alternate wireless channel quality metric. The device determines whether to output through a user interface of the device, an indication of an alternate location from the database of connection information based on the current connection information set and at least one of the alternate connection information sets.

25 Claims, 5 Drawing Sheets

(56) References Cited

U.S. PATENT DOCUMENTS

| | | |
|---|---|---|
| 2009/0005041 A1 | 1/2009 | Steinberg et al. |
| 2009/0245118 A1 | 10/2009 | McCormick |
| 2011/0201336 A1* | 8/2011 | Garrett et al. ................ 455/436 |
| 2011/0201347 A1* | 8/2011 | Abraham et al. .......... 455/456.1 |
| 2012/0208522 A1* | 8/2012 | Marklund et al. ......... 455/422.1 |
| 2013/0069828 A1* | 3/2013 | Cheng et al. ................. 342/458 |

* cited by examiner

METHOD AND APPARATUS FOR PROVIDING WIRELESS CONNECTION QUALITY GUIDANCE

BACKGROUND

1. Field

The present disclosure relates generally to handheld user devices, and more particularly to handheld user devices that provide location information for improved wireless communication connections.

2. Background

The wireless connection of a handset can be affected by the location of the handset relative to a building and landscape. A weak connection negatively impacts the performance, content streaming, and battery life. Sometimes moving the handset a short distance by walking in a room towards the window, stepping further away from a metal fence, driving a car to a different spot in a garage, drastically improves the wireless connection. Often times, the user is not aware of locations or "sweet spots" where improved wireless connections are available.

Others have addressed the weak wireless connections by: (1) boosting antenna power when transmitting a signal; (2) having a user interface of the mobile device indicate the signal strength with a bar; (3) having a user interface of a mobile device warn the user if the connection is bad and to, for example, try the streaming service later; and (4) using multiple-input-multiple-output support inside the mobile device.

SUMMARY

In an aspect of the disclosure, a method, a computer program product, and an apparatus are provided. An apparatus, e.g. a user device, determines a set of connection information at a current location of the device. The current connection information set includes one or more of current location information, current wireless channel information, current radio access technology (RAT) information, and a current wireless channel quality metric. The device adds the current connection information set to a database of connection information that stores a plurality of sets of alternate connection information. Each alternate connection set includes one or more of alternate location information, alternate wireless channel information, alternate RAT information, and an alternate wireless channel quality metric. The device determines whether to output through a user interface of the device, an indication of an alternate location from the database of connection information based on the current connection information set and at least one of the alternate connection information sets.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of providing location information for improved wireless communication connections are presented below with reference to various apparatuses and methods. These apparatuses and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

As described above, the quality of a wireless communication connection of a handset can be affected by the location of the handset relative to a building and landscape. Disclosed herein is a mobile handset that periodically monitors a wireless connection and records both a channel quality metric (such as SNR) and the location corresponding to the wireless connection. The location can be determined using GPS, cellular triangulation, an accelerometer/compass, or a combination thereof. The wireless connection may be based on different radio access technologies (RAT), such as 3G, 4G LTE, WiMax, NCF, Bluetooth WiFi, or others. The mobile handset compares the channel quality of the current connection with the channel quality of one or more stored connections. If a better wireless connection is available nearby the current location of the handset, then the handset outputs location information to guide the user to a better location.

The mobile handset may guide the user to a location with a better wireless connection that is available through a different RAT based on stored channel quality information. For example, the handset may be relocated from its current 4G LTE wireless connection to a better WiFi wireless connection. A voice call can benefit from this as well. Mobile devices can share sweet spot information, and retransmit sweet spot information to a base station. The base station may detect a time-invariant sweet spot and broadcast corresponding information to other mobile devices.

Figure 1:
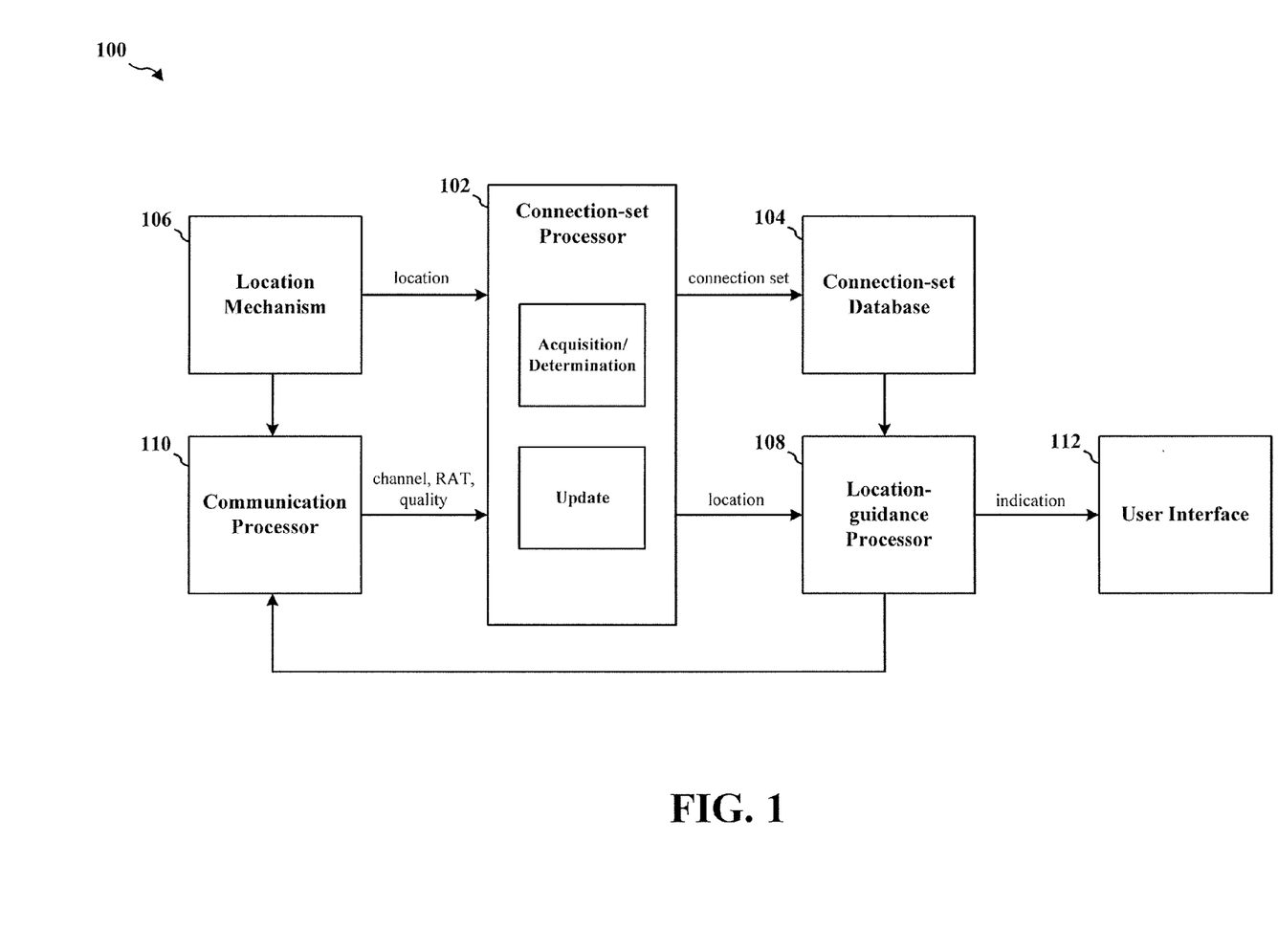
FIG. 1 is a block diagram of an apparatus that provides location information for improved wireless communication connections.

FIG. 1 is a block diagram of an apparatus 100 that provides location information for improved wireless communication connections. The apparatus may be a mobile handset, such as a Smartphone or tablet. The apparatus 100 includes a connection-set processor 102, a connection-set data base 104, a location mechanism 106, a location guidance processor 108, a communication connection processor 110 and a user interface 112.

The connection set processor 102 is configured to periodically determine a set of connection information for the handset while the handset is at a current location. To this end, the connection set processor 102 obtains information corresponding to the current location of the handset. This information may be obtained from the location mechanism 106. In one configuration, the location mechanism 106 may be a GPS component that provides GPS coordinates corresponding to the location of the handset. In another configuration, the location mechanism 106 may be an algorithm that derives the current location of the handset base on cellular triangulation. In yet another configuration, the location mechanism 106 may be an accelerometer/compass.

The connection set processor 102 also obtains radio access technology (RAT) information and wireless channel information corresponding to the RAT and channel through which the handset is currently communicating. The connection set processor 102 also obtains a current wireless channel quality metric. The quality metric may be, for example, a signal-to-noise ration (SNR), reference signal received power (RSRP), reference signal received quality (RSRQ), or a receive strength signal indicator (RSSI). This information may be obtained from the communication connection processor 110, which is configured to perform the communication functions of the handset, including selection of RATs and/or wireless channel connections.

The connection-set database 104 stores a number of connection set entries. Each connection set entry includes location information, and wireless channel information (e.g., frequency), RAT information (e.g., 3G, 4G LTE, or WiFi), and wireless channel quality metric (e.g., SNR, RSSI, RSRQ, etc.) corresponding to that location. The connection set entries may be obtained from the connection-set processor 102 of the handset, or from a network component that obtains connection set information from various sources. For example, a base station may collect and store connection information from various handsets and provide the connection sets to the handset through a unicast signal or a broadcast signal.

The connection set processor 102 is configured to add the current connection information set to the database 104 of connection information. The connection set processor 102 is also configured to periodically delete connection information from the database 104. For example, when the handset has not been within a threshold distance of a location within a threshold period of time, that location and the set of connection information associated with that location may be deleted from the database 104. In one specific example, the threshold distance may be 30 miles and the threshold period of time may be 48 hours.

The location guidance processor 108 is configured to determine whether to output an indication of an alternate location from the database 104 based on the current connection information set and the connection information sets stored in the database. To this end, the location guidance component 108 compares the wireless channel quality metric at the current location of the handset to one or more alternate wireless channel quality metrics included in the database 104.

In one configuration, the location guidance component 108 filters the database connection sets such that only those connection sets having an associated alternate location within a threshold distance of the current location of the handset, and/or an associated RAT supported by the handset are considered as potential alternate locations. The location guidance component 108 processes the filtered set of connection sets and identifies, as a preferred alternate connection information set, an alternate connection information set having an associated alternate wireless channel quality metric that is better than the current wireless channel quality metric. Upon identifying a preferred alternate connection set, the location guidance component 108 outputs an indication of the alternate location associated with the identified preferred alternate connection information set. The indication may be a display of the alternate location on a user interface 112 of the handset.

Upon being relocated to the alternate location, the communications connection processor 110 switches the communication connection to the alternate connection, if channel quality at the alternative location is indeed better. If the current RAT used by the handset is different from the RAT associated with the preferred alternate location then the communication connection processor 110 switches operation of the handset to the RAT of the alternate location. The communication connection processor 110 also switches operation of the handset to the wireless channel associated with the preferred alternate connection information set.

Figure 2:
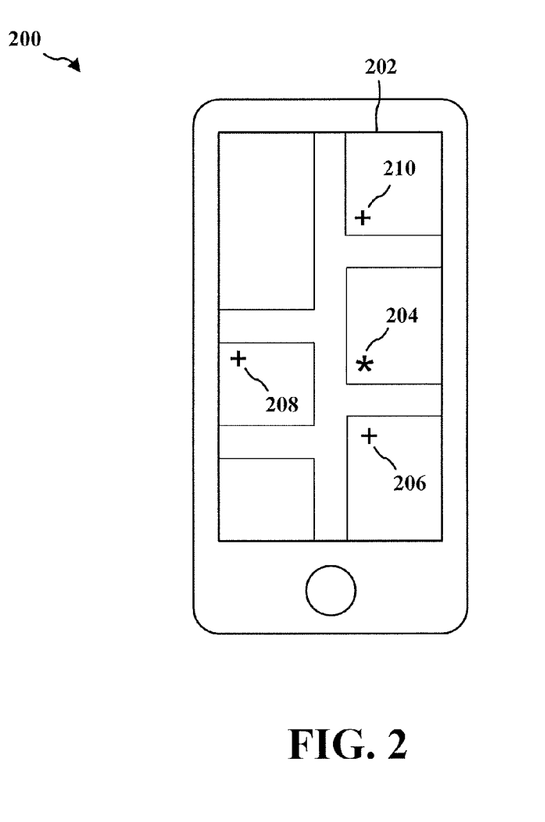
FIG. 2 is a diagram illustrating a handheld user device displaying location information for improved wireless communication connections.

FIG. 2 is an illustration of a handheld user device 200 with a display 202 showing location information. The display 202 shows a current location 204 of a handheld set. If the location-guidance processor 108 of the handheld set determines that a better wireless communication connection is available nearby the current location 204, the handheld user device 200 may output an indication of one or more locations having better connections. For example, display 202 may present a first better location 206 corresponding to the location closest to the current location that has the best communication connection. The display may also display additional locations 208, 210 that may have better communication connections that the first better location 206, but are further from the current location 204. Alternatively, the handheld user device 200 may provide an audible indication providing navigation directions from the current location 204 to the first better location 206. In the case of a visual display, in order to limit interfering with running application or other current use of the handheld user device 200, the indication of a better location may appear on a portion of the display 202 less than the entire display. For example, the indication may appear on a pop-up screen.

Figure 3:
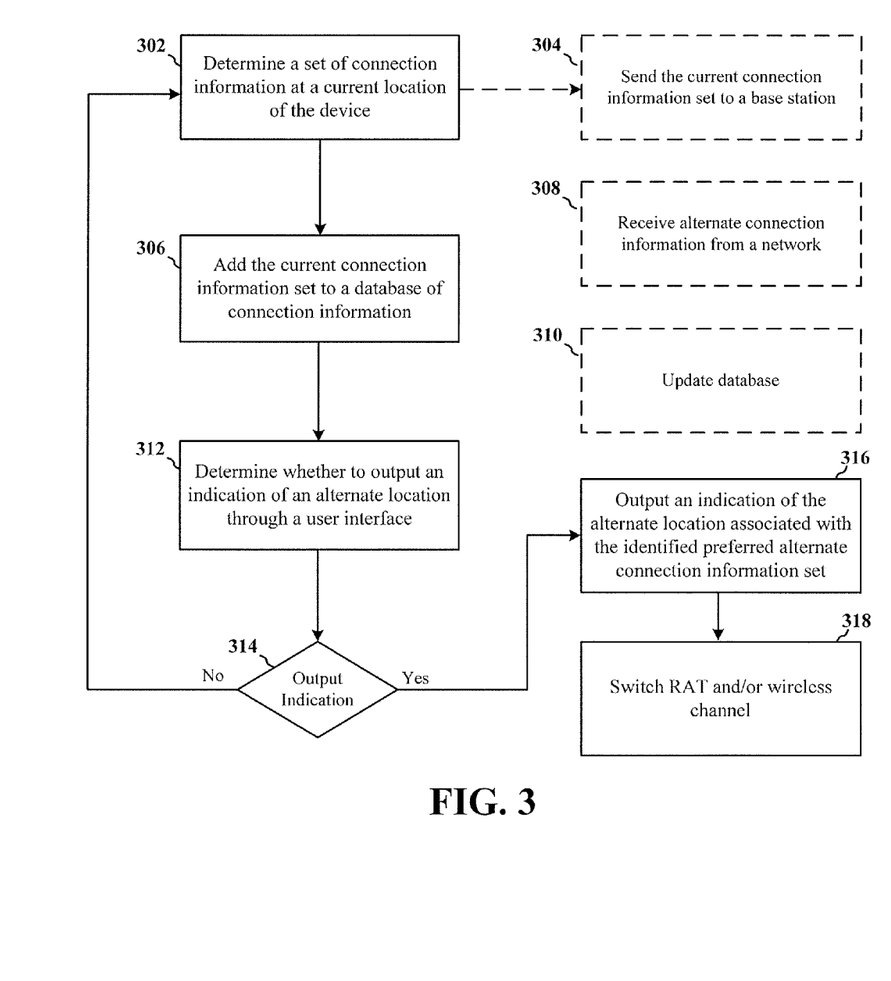
FIG. 3 is a flow chart of a method of providing location information for improved wireless communication connections.

FIG. 3 is a flow chart of a method of providing location information for improved wireless communication connections. The method may be performed by a user device. At step 302, the user device determines a set of connection information at a current location of the device. The current connection information set includes one or more of current location information, current wireless channel information, current RAT information, and a current wireless channel quality metric. At step 304, the device optionally sends the current connection information set to a base station.

At step 306, the user device adds the current connection information set to a database of connection information. The database includes a plurality of sets of alternate connection information, each including one or more of alternate location information, alternate wireless channel information, alternate RAT information, and an alternate wireless channel quality metric. At step 308, the device optionally receives alternate connection information from a network component, such as a base station. Receipt of this information may occur periodically, e.g., every hour, or may be triggered by a change in location of the device. For example, if the device is relocated a threshold distance, e.g., 30 miles, from its "home" location, the device may receive alternate connection set information from the network. Home location refers to the location where the device is located a majority of the time.

At step 310, the device optionally updates its database by deleting one or more sets of connection information from the database. For example, if the device has not been within a threshold distance of the location associated with the one or more sets of connection information within a threshold period of time, those sets are likely not to be needed by the device and therefore can be deleted. The threshold period of time may be between 12 hours and 48 hours.

At step 312, the device determines whether to output an indication of an alternate location through a user interface. The determination is based on the current connection information set and at least one of the plurality of alternate connection information sets. In order to determine whether to output an alternate location indication, the device may compare the wireless channel quality metric at the current location of the device to one or more alternate wireless channel quality metrics having an associated alternate location within a threshold distance of the current location, and an associated RAT supported by the device. Based on the comparison, the device may identify as a preferred alternate connection information set, an alternate connection information set having an associated alternate wireless channel quality metric that is better than the current wireless channel quality metric.

At step 314, if an indication of an alternate location is not to be output, the process returns to step 302. If at step 314 an indication of an alternate location is to be output, then at step 316, the device outputs an indication of an alternate location associated with the identified preferred alternate connection information set.

At step 318, the device, upon being relocated to the alternate location, switches to the RAT associated with preferred alternate connection information set if the associated RAT is different from the current RAT, and switches to the wireless channel associated with the preferred alternate connection information set.

Figure 4:
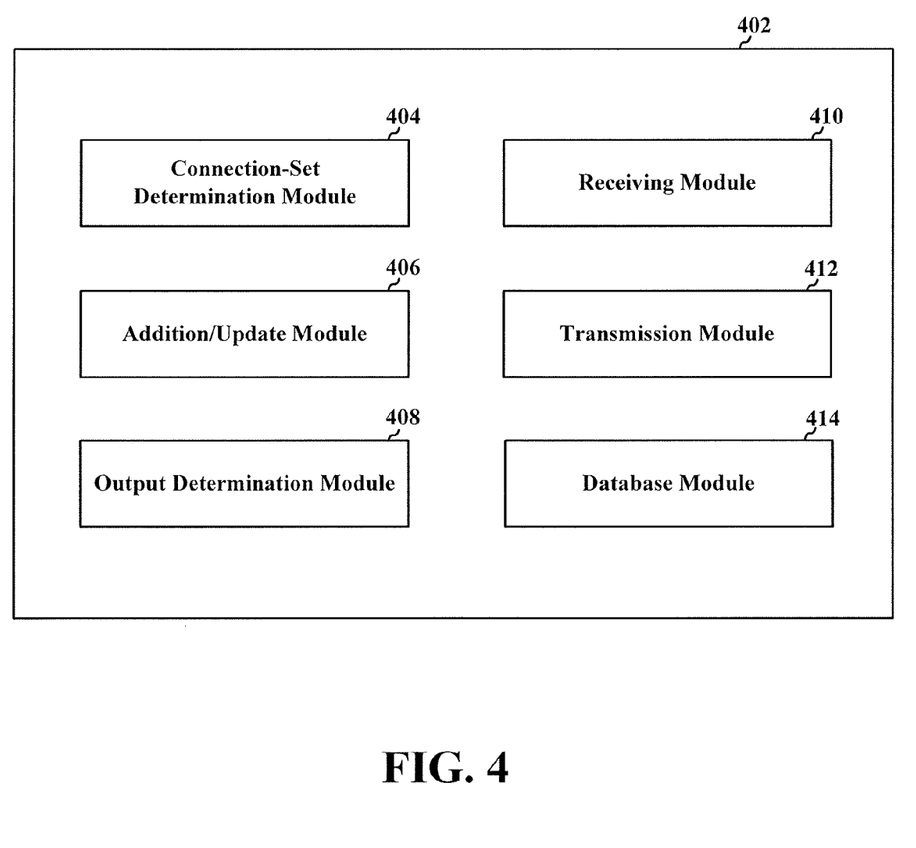
FIG. 4 is a block diagram illustrating the modules/means/components of a user device that implements the method of FIG. 3.

FIG. 4 is a block diagram illustrating the modules/means/components of a user device 402 with location guidance capabilities. The apparatus includes a connection-set determination module 404, a connection-set addition/update module 406, an output determination module 408, a receiving module 410, a transmission module 412, and a database module 414.

The connection-set determination module 404 determines a set of connection information at a current location of the device. The current connection information set includes one or more of current location information, current wireless channel information, current RAT information, and a current wireless channel quality metric. The connection-set determination module 404 may be part of the connection-set processor 102 of FIG. 1.

The connection-set addition/update module 406 adds the current connection information set to the database 414 of connection information. The connection-set addition/update module 406 may be part of the connection-set processor 102 of FIG. 1. The database 414 includes a plurality of sets of alternate connection information. Each alternate connection information set includes one or more of alternate location information, alternate wireless channel information, alternate RAT information, and an alternate wireless channel quality metric.

The output determination module 408 determines whether to output through a user interface of the device, an indication of an alternate location from the database of connection information based on the current connection information set and at least one of the plurality of alternate connection information sets. The output determination module 408 may be part of the location-guidance processor 108 of FIG. 1.

The receiving module 410 may receive one or more of the plurality of alternate connection information sets from a base station. These alternate connection information sets are added to the database 414. The transmission module 412 may sends the current connection information set to a base station.

The apparatus may include additional modules that perform each of the steps of the algorithm in the aforementioned flow chart of FIG. 3. As such, each step in the aforementioned flow chart of FIG. 3 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 5:
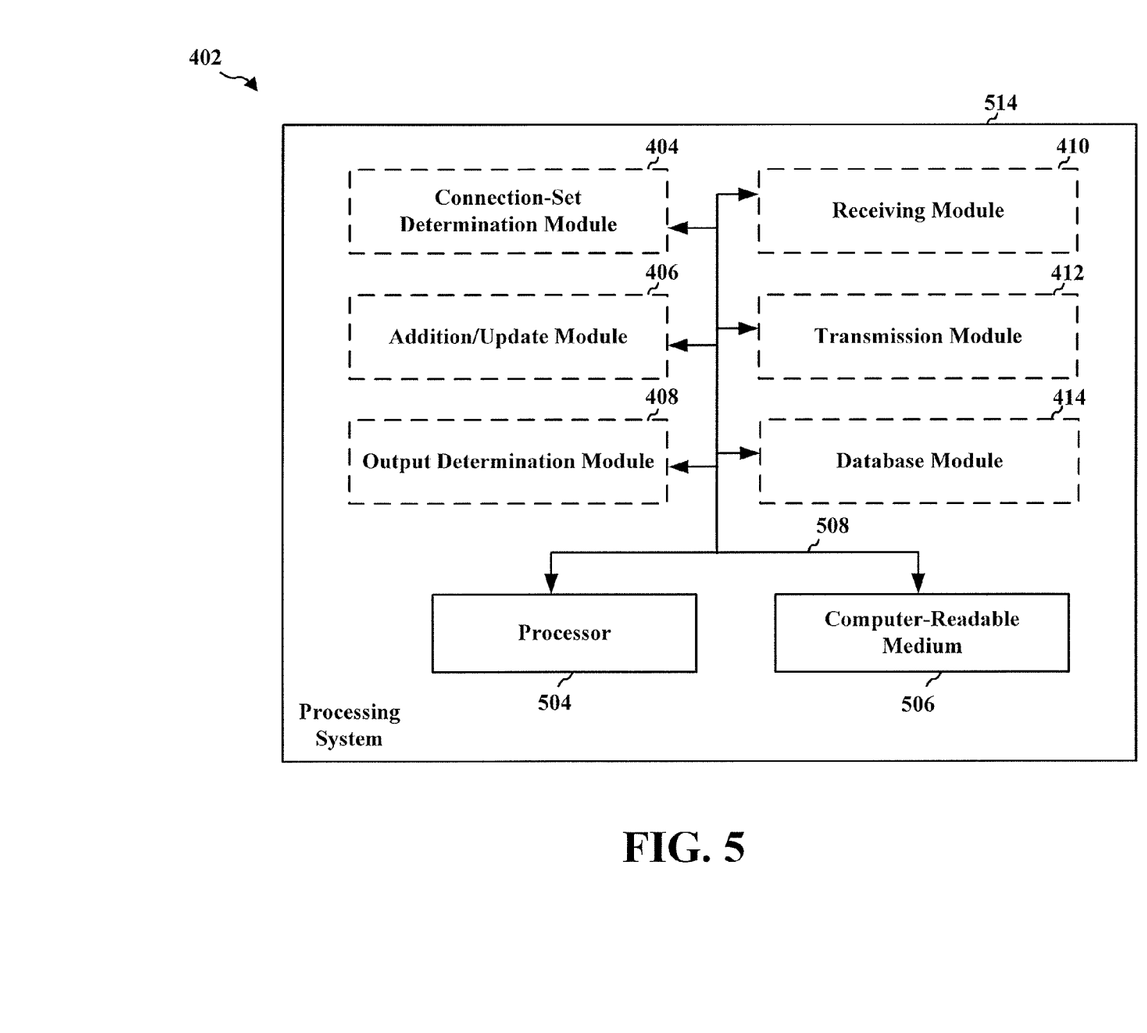
FIG. 5 is a diagram illustrating a hardware implementation for a user device employing a processing system to implement the method of FIG. 3.

FIG. 5 is a diagram illustrating an example of a hardware implementation for a user device 402 employing a processing system 514. The processing system 514 may be implemented with a bus architecture, represented generally by the bus 508. The bus 508 may include any number of interconnecting buses and bridges depending on the specific application of the processing system 514 and the overall design constraints. The bus 508 links together various circuits including one or more processors and/or hardware modules, represented by the processor 504, the modules 404, 406, 408, 410, 412 and 414 and the computer-readable medium 506. The bus 508 may also link various other circuits such as timing sources, peripherals, voltage regulators, and power management circuits, which are well known in the art, and therefore, will not be described any further.

The processing system 514 includes a processor 504 coupled to a computer-readable medium 506. The processor 504 is responsible for general processing, including the execution of software stored on the computer-readable medium 506. The software, when executed by the processor 504, causes the processing system 514 to perform the various functions described supra for any particular apparatus. The computer-readable medium 506 may also be used for storing data that is manipulated by the processor 504 when executing software. The processing system further includes at least one of the modules 404, 406, 408, 410, 412, and 414. The modules may be software modules running in the processor 504, resident/stored in the computer readable medium 506, one or more hardware modules coupled to the processor 504, or some combination thereof.

In one configuration, the user device 402 includes means for determining a set of connection information at a current location of the device, means for adding the current connection information set to a database of connection information, and means for determining whether to output through a user interface of the device, an indication of an alternate location from the database of connection information based on the current connection information set and at least one of the plurality of alternate connection information sets. The means for determining whether to output may include means for comparing the wireless channel quality metric at the current location to one or more alternate wireless channel quality metrics having an associated alternate location within a threshold distance of the current location, and an associated RAT supported by the device, and means for identifying as a preferred alternate connection information set, an alternate connection information set having an associated alternate wireless channel quality metric that is better than the current wireless channel quality metric.

The apparatus may further include means for, upon being relocated to the alternate location, switching to the RAT associated with preferred alternate connection information set if the associated RAT is different from the current RAT, and switching to the wireless channel associated with the preferred alternate connection information set. The apparatus may also include means for receiving one or more of the plurality of alternate connection information sets from a base station, means for sending the current connection information set to a base station, and means for adding is configured to delete a set of connection information from the database when the device has not been within a threshold distance of the location associated with the set of connection information within a threshold period of time.

The aforementioned means may be one or more of the aforementioned modules of the apparatus 402 and/or the processing system 514 of the apparatus 402' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a wireless user device, comprising:
    determining a set of connection information at a current location of the device, the current connection information set including one or more of current location information, current wireless channel information, current radio access technology (RAT) information, and a current wireless channel quality metric;
    adding the current connection information set to a database of connection information, the database comprising a plurality of alternate connection information sets, each alternate connection information set including one or more of alternate location information, alternate wireless channel information, alternate RAT information, and an alternate wireless channel quality metric;
    deleting a set of connection information from the database when the device has not been within a threshold distance of the location associated with the set of connection information within a threshold period of time; and
    determining whether to output through a user interface of the device, an indication of an alternate location from the database of connection information based on the current connection information set and at least one of the plurality of alternate connection information sets.

2. The method of claim 1, wherein determining whether to output comprises:
    comparing the wireless channel quality metric at the current location to one or more alternate wireless channel quality metrics associated with the one or more identified alternate connection information sets; and
    identifying as a preferred alternate connection information set, an identified alternate connection information set having an associated alternate wireless channel quality metric that is better than the current wireless channel quality metric.

3. The method of claim 2, wherein identifying comprises outputting an indication of the alternate location associated with the identified preferred alternate connection information set.

4. The method of claim 3, wherein outputting an indication comprises displaying the alternate location on a display of the device.

5. The method of claim 3, further comprising:
upon being relocated to the alternate location, switching to the RAT associated with preferred alternate connection information set if the associated RAT is different from the current RAT, and switching to the wireless channel associated with the preferred alternate connection information set.

6. The method of claim 1, further comprising receiving one or more of the plurality of alternate connection information sets from a base station.

7. The method of claim 6, wherein the received plurality of alternate connection information sets is filtered from a larger set of connection information sets based on the current location of the device.

8. The method of claim 1, further comprising sending the current connection information set to a base station.

9. A handheld user device, comprising:
means for determining a set of connection information at a current location of the device, the current connection information set including one or more of current location information, current wireless channel information, current radio access technology (RAT) information, and a current wireless channel quality metric;
means for adding the current connection information set to a database of connection information, the database comprising a plurality of alternate connection information sets, each alternate connection information set including one or more of alternate location information, alternate wireless channel information, alternate RAT information, and an alternate wireless channel quality metric; and
means for determining whether to output through a user interface of the device, an indication of an alternate location from the database of connection information based on the current connection information set and at least one of the plurality of alternate connection information sets,
wherein the means for adding is configured to delete a set of connection information from the database when the device has not been within a threshold distance of the location associated with the set of connection information within a threshold period of time.

10. The apparatus of claim 9, wherein the means for determining whether to output comprises:
means for comparing the wireless channel quality metric at the current location to one or more alternate wireless channel quality metrics associated with the one or more identified alternate connection information sets; and
means for identifying as a preferred alternate connection information set, an alternate connection information set having an associated alternate wireless channel quality metric that is better than the current wireless channel quality metric.

11. The apparatus of claim 10, wherein the means for identifying is configured to output an indication of the alternate location associated with the identified preferred alternate connection information set.

12. The apparatus of claim 11, wherein the indication comprises a display of the alternate location on a display of the device.

13. The apparatus of claim 11, further comprising:
means for, upon being relocated to the alternate location, switching to the RAT associated with preferred alternate connection information set if the associated RAT is different from the current RAT, and switching to the wireless channel associated with the preferred alternate connection information set.

14. The apparatus of claim 9, further comprising means for receiving one or more of the plurality of alternate connection information sets from a base station.

15. The apparatus of claim 14, wherein the received plurality of alternate connection information sets is filtered from a larger set of connection information sets based on the current location of the device.

16. The apparatus of claim 9, further comprising means for sending the current connection information set to a base station.

17. A user device, comprising:
a memory; and
at least one processor coupled to the memory and configured to:
determine a set of connection information at a current location of the device, the current connection information set including one or more of current location information, current wireless channel information, current radio access technology (RAT) information, and a current wireless channel quality metric;
add the current connection information set to a database of connection information, the database comprising a plurality of alternate connection information sets, each alternate connection information set including one or more of alternate location information, alternate wireless channel information, alternate RAT information, and an alternate wireless channel quality metric; and
determine whether to output through a user interface of the device, an indication of an alternate location from the database of connection information based on the current connection information set and at least one of the plurality of alternate connection information sets,
wherein the processor is further configured to delete a set of connection information from the database when the device has not been within a threshold distance of the location associated with the set of connection information within a threshold period of time.

18. The device of claim 17, wherein the processor determines whether to output by being further configured to:
compare the wireless channel quality metric at the current location to one or more alternate wireless channel quality metrics associated with the one or more identified alternate connection information sets; and
identify as a preferred alternate connection information set, an alternate connection information set having an associated alternate wireless channel quality metric that is better than the current wireless channel quality metric.

19. The device of claim 18, wherein the processor identifies by being further configured to output an indication of the alternate location associated with the identified preferred alternate connection information set.

20. The device of claim 19, wherein the processor outputs an indication by being further configured to display the alternate location on a display of the device.

21. The device of claim 19, wherein the processor is further configured to:
upon being relocated to the alternate location, switch to the RAT associated with preferred alternate connection information set if the associated RAT is different from the current RAT, and switching to the wireless channel associated with the preferred alternate connection information set.

22. The device of claim 17, wherein the processor is further configured to receive one or more of the plurality of alternate connection information sets from a base station.

23. The device of claim 22, wherein the received plurality of alternate connection information sets is filtered from a larger set of connection information sets based on the current location of the device.

24. The device of claim 17, wherein the processor is further configured to send the current connection information set to a base station.

25. A non-transitory computer-readable medium storing computer executable code for a user device, comprising code for:
  determining a set of connection information at a current location of the device, the current connection information set including one or more of current location information, current wireless channel information, current radio access technology (RAT) information, and a current wireless channel quality metric;
  adding the current connection information set to a database of connection information, the database comprising a plurality of alternate connection information sets, each alternate connection information set including one or more of alternate location information, alternate wireless channel information, alternate RAT information, and an alternate wireless channel quality metric;
  deleting a set of connection information from the database when the device has not been within a threshold distance of the location associated with the set of connection information within a threshold period of time; and
  determining whether to output through a user interface of the device, an indication of an alternate location from the database of connection information based on the current connection information set and at least one of the one or more identified alternate connection information sets.

* * * * *